Dec. 8, 1959     E. C. L. DE FAYMOREAU ET AL     2,916,738

SEARCHING AND TRACKING RECEIVER

Filed Sept. 10, 1957     2 Sheets-Sheet 1

Inventors
ETIENNE C. L. de FAYMOREAU
MARK MANDEL
By Philip M. Bolton
Attorney

Dec. 8, 1959  E. C. L. DE FAYMOREAU ET AL  2,916,738
SEARCHING AND TRACKING RECEIVER
Filed Sept. 10, 1957  2 Sheets-Sheet 2
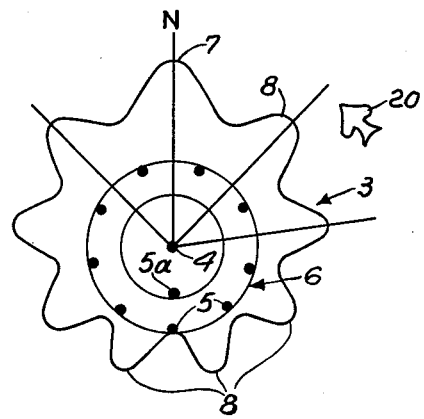
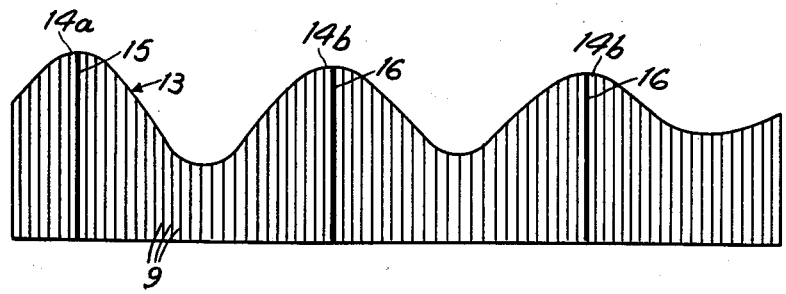
Inventors
ETIENNE C. L. de FAYMOREAU
MARK MANDEL
By Philip M. Bolton
Attorney United States Patent Office
2,916,738
Patented Dec. 8, 1959

2,916,738

SEARCHING AND TRACKING RECEIVER

Etienne C. L. de Faymoreau, Nutley, and Mark Mandel, Bloomfield, N.J., assignors to International Telephone and Telegraph Corporation, Nutley, N.J., a corporation of Maryland Application September 10, 1957, Serial No. 683,122

7 Claims. (Cl. 343—106)

This invention relates to a navigation system and more particularly therefore to a searching and tracking receiver.

In the aerial navigation system known as TACAN, there are included pulse-emitting beacon or ground transmitters and mobile station receivers, such as, for example, those carried on airplanes. The transmitting antenna system in the beacon produces a multilobed directional pattern rotating at about 15 cycles per second. To a receiver receiving the pulse signals from the transmitter, the rotation of the antenna pattern produces an amplitude modulation envelope on these pulses, the phase of which envelope varies at different azimuthal angles from the beacon station. When the major lobe of the directional pattern points in a given direction, such as north, a special signal in the form of a short burst of pulses is transmitted from the beacon, which signal is referred to as the "north" or "main" reference signal. By comparing the phase of the modulation envelope (due to rotation of the beacon pattern) with that of the north signal, an indication of the bearing of the receiver with respect to the beacon is obtained. If only the north signal and a single-lobed directional pattern are employed, only a relatively coarse indication of bearing would be obtainable. To obtain a finer indication, the directional pattern is multilobed with each lobe separated, for example by 40 degrees from the next and with auxiliary reference pulse signals in the form of short bursts of pulses being emitted each time one of these lobes passes the predetermined reference point (i.e., the north) as the pattern is rotated. The rotation of this pattern produces a modulation envelope of 135 cycles per second (9 lobes multiplied by 15 cycles per second) on top of the fundamental of 15 cycles per second due to the main directive lobe. At the receiver, the phase of the auxiliary pulse signals is compared with respect to that of the 135 cycles-per-second modulation envelope; and a fine indication is thereby obtained in addition to the coarse one.

Actually in TACAN, the coarse indication gives the 40-degree sector of the azimuthal angle of the mobile receiver with respect to the beacon; and the more precise angle within this 40-degree sector is found by the comparison of the auxiliary reference pulse signals with the corresponding 135 cycle-per-second signal. The 40-degree sector is found and thereafter maintained by a searching and tracking operation involving the north reference pulse and the 15 cycles-per-second wave. For this purpose, the incoming pulses which carry the amplitude modulation of the 15 cycle-per-second envelope are filtered to derive a 15 cycle-per-second wave. This wave is then phase shifted by continuously increasing amounts; and from the phase-shifted wave, there is then produced a gating pulse which is therefore likewise continuously phase shifted and is applied to a coincidence circuit to which the north reference pulse signal, as detected, is likewise applied. When coincidence occurs between the gating pulse and the detected north reference pulse, the system is switched from a searching to a tracking operation with the tracking being controlled for finer indication by phase comparison of the auxiliary reference signals and the 135 cycle-per-second wave. The continued coincidence of the north pulse and the gating pulse maintains the system in tracking position.

It is desirable that the gating pulse be maintained as wide as feasible during tracking to prevent the system from going unnecessarily back to the "search" condition. One of the reasons this may occur is that there may be a momentary shift in phase of the 15 cycle-per-second wave due to such factors as interference, a momentary weakening or loss of the signal, etc. There are also certain phase shifts that are difficult to compensate for which occur in this system; and tolerances for these uncontrolled phase shifts must be built into the equipment and, therefore, into the tracking gate. Furthermore, during the tracking period, the auxiliary pulses and the 135 cycle-per-second wave control the system; and if the azimuthal change of the plane in flight is rapid and the gate is too narrow, then the system would tend to jump rather frequently from tracking to searching as the plane cuts across the 40-degree sectors. On the other hand, there is a limit to the desirable width of the gate during tracking because if it covers greater than a 40-degree sector an erroneous reading might be produced.

During the search period, it is desirable that the gate width be narrower than 40 degrees, otherwise, an error in the particular 40-degree sector indication might be produced. It will be seen that if the gate, instead of covering a certain 40-degree sector indicated by the azimuth indicators, in fact, shifted to a greater extent or a lesser extent, coincidence with the north pulse in the wrong sector might be produced. This shifting of the gate might be produced, for example, either because of weakness of the 15 cycle-per-second modulation envelope or due to bursts of noise.

An object of the present invention is the provision of an improved search and track navigation receiver.

Another object of the present invention is the provision in a search and track navigation receiver of an arrangement to provide bearing information with increased accuracy over prior systems.

A further object of the present invention is to provide a search and track navigation receiver providing more accurate bearing information, for example, in the presence of noise, site errors, and faults in transmission, while minimizing unnecessary jumping between track and search conditions.

The foregoing and other objects and features of this invention and the manner of attaining them will become more apparent and the invention itself will be best understood by reference to the folllowing description of an embodiment of the invention taken in conjunction with the accompanying drawings comprising Figs. 1, 2, and 3, wherein:

Fig. 2 is a diagram of the radiation pattern of the antenna of the beacon; and

Fig. 3 is a curve showing the effective amplitude modulation envelope of the pulses transmitted from the beacon.

Figure 1:
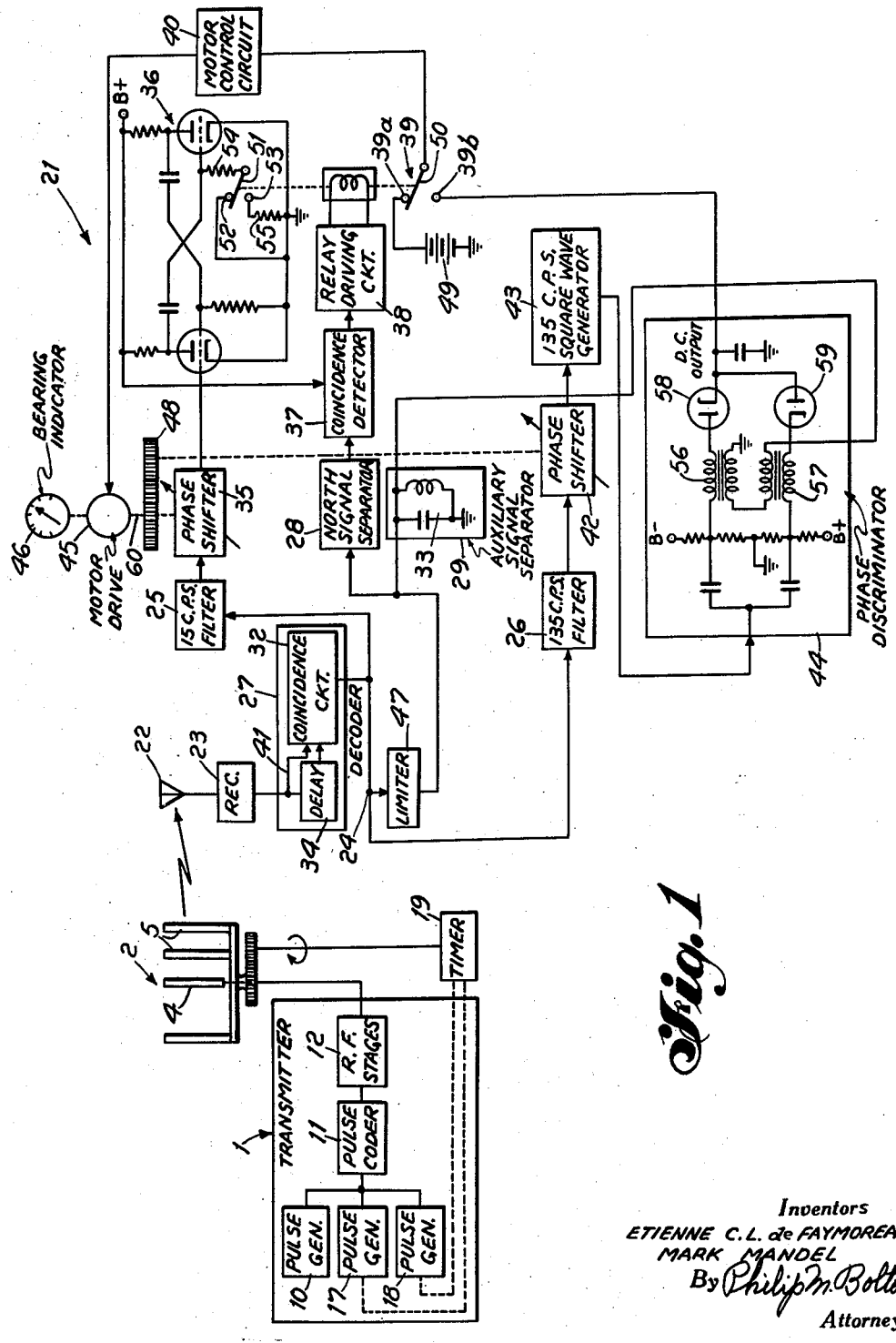
Fig. 1 is a simplified block diagram of a TACAN beacon transmitter and associated mobile receiver.

Referring now to Fig. 1, a beacon station 1 emits pulses from its rotating antenna 2 according to a multilobed directional pattern 3, such as shown in Fig. 2. The pattern is rotated at the rate of 15 cycles per second. The antenna system may consist of a central omnidirectional antenna 4 with passive reflectors 5 spaced thereabout at 40 degrees separation, and an additional single reflector 5a, the reflectors being, for example, printed on a pair of cylinders 6 which rotate around the central radiator 4, the pattern consisting of a major lobe or directional configuration 7 produced by 5a with minor lobes 8 produced by reflectors 5 spaced every 40 degrees therefrom.

Semi-random pulses 9 (see Fig. 3) are generated by a pulse generator 10 in the beacon which may be, for example, a free-running multivibrator. These pulses 9, generated at about 2700 per second before transmission, are applied to a pulse coder 11, which changes each single pulse into a pair of pulses spaced 12 microseconds. The pulses from the coder 11 are used to key or modulate an R-F oscillator in an R-F section 12 which may also include various amplifier stages. The R-F pulses are then fed to the antenna system 2 from whence they are emitted according to the directional pattern 3 of Fig. 2. The rotation of the antenna reflectors, in effect, produces an amplitude modulation envelope 13 (Fig. 3) on the pulses, with a maximum amplitude peak 14a corresponding to the maximum lobe 7 and the other peaks 14b corresponding to the minor lobes 8. The multilobed antenna pattern which is rotating at 15 cycles per second produces a modulation envelope of 135 cycles per second (9 lobes multiplied by 15 c.p.s.) on top of the fundamental of 15 c.p.s.

As the antenna system 2 rotates so that the major lobe 7 passes a given reference direction, such as, for example, north, a reference pulse signal is emitted which is called hereinafter the "north" or "main" reference signal 15. While north signal 15 is shown as a solid black line in Fig 3, it actually consists of a number of pulses closely spaced together in a unique pattern as described hereinafter. As each minor lobe 8 passes the reference direction, remembering that the minor lobes are spaced by 40 degrees from each other and from the north lobe, an "auxiliary" reference signal 16 is emitted. This, likewise, is shown in Fig. 3 as a solid black line, but actually consists of a unique series of pulses closely spaced together. The north reference signals 15 may be produced by a pulse generator 17 which produces 12 pulses separated by 30 microseconds, which pulses are applied to the pulse coder 11 thereby producing 12 pulse pairs, or 24 pulses, with the spacing between the pulses of a pair being 12 microseconds. The auxiliary reference signals 16 may be generated by a generator 18 producing a burst of 6 pulses, separated 24 microseconds apart (from leading edge to leading edge), which are fed from the generator 18 into the pulse coder 11 where the 6 pulses are then doubled to become 6 pairs of pulses or 12 pulses with a 12 microsecond spacing between adjacent pulses.

Generators 17 and 18 may consist of conventional pulse generators feeding tapped delay lines or ringing circuits to produce a desired number of pulses with the proper spacing for the north or auxiliary reference groups as described above. Suitable timing means 19, which can take any one of various forms well known in the art, may be associated with the antenna system 2 and pulse generators 17 and 18 to cause the north and auxiliary reference signals to be emitted at the proper time.

The emitted pulses are received on a receiver 21 located in a mobile vehicle 20 (Fig. 2), such as, for example, an airplane. The signal is picked up on an omnidirectional antenna 22 and fed to a receiver 23, which removes the R-F envelope and detects the signal to produce amplitude modulated pulse signals which contain the following four components:

(1) The 15 cycle-per-second envelope component.
(2) The 135 cycle-per-second envelope component.
(3) The north or main reference signal component.
(4) The auxiliary reference signal component.

The output of receiver 23 is fed into decoder 27 which consists essentially of a coincidence circuit 32 to which the input pulses are fed directly along line 41, the pulses, likewise being fed to said coincidence circuit 32 through a delay device 34 having a delay of 12 microseconds. The coincidence circuit 32 produces an output when a delay pulse coincides with an input pulse directly applied thereto. Various other arrangements for decoding the delay of one pulse with respect to the other will occur to those versed in the art.

The aforementioned components are separated as follows. The output of decoder 27 is then fed via line 24 to two filters, 25 and 26. The 15 cycle-per-second component, which is the component produced by the major lobe for each rotation, is separated from the amplitude modulated envelope by filter 25. The 135 cycle-per-second component, which is the component produced by the 40-degree minor lobe components, is separated from the amplitude modulated envelope by filter 26.

To separate the north and auxiliary reference signals, the output of decoder 27 is first fed to an amplifier and limiter circuit 47 which removes the audio amplitude modulation therefrom. The output of limiter 47 is then fed to a north signal separation circuit 28 and an auxiliary signal separation circuit 29, each of which includes a ringing circuit 33. The ringing circuit of the north signal separator 28 is tuned to approximately 33 kilocycles to respond to the north signal pulses which are separated by 30 microseconds. The auxiliary pulse ringing circuit 29 is tuned to approximately 83 kilocycles to respond to the auxiliary pulses as obtained from the decoder 27, which is separated by 12 microseconds. Pulses whose spacing does not correspond to the repetition frequency to which the various ringing circuits are tuned will not produce oscillations of sufficient amplitude to produce indications. For this purpose a threshold device may be incorporated either in said separators or in the circuits to which their outputs are connected.

The receiver 21 provides for both search and track operations. The 15 cycle-per-second wave from filter 25 is fed into a variable phase shifter 35, which is continuously varied during search to phase shift the 15 cycle-per-second wave by continuously varying amounts. The output of phase shifter 35 is then used to trigger a gate forming circuit, gate generator 36, which during search produces a gate of 30 degrees duration (when 360 degrees is the period of one rotation of the multilobed directional pattern). Gate generator 36 is essentially a conventional plate coupled monostable multivibrator. By adjusting the time constant network of this multivibrator we can obtain an output gate of different durations as will be pointed out hereinafter. Coincidence between the 30-degree gate produced by gate generator 36 and the north reference pulse produced by north signal separator 28 is detected in coincidence detector 37 to produce an output. The output of coincidence detector 37 is fed into a relay driving circuit 38 which energizes relay 39. The relay driving circuit 38 may consist of a tube arrangement having the relay coil of relay 39 located in its plate circuit. When the output of coincidence detector 37 is fed into this tube, plate current will begin to flow thus energizing the relay 39. The condition of the system in search operation prior to this coincidence and energization of relay 39 is as follows. With relay 39 de-energized, voltage from a source of potential 49 is applied via contact 39a and armature 50 of relay 39 to a motor control circuit 40 (described more fully hereinafter) which in turn drives motor 45, the motor 45 being connected through suitable linkage 60 to the phase shifter 35 to continually scan it over its entire range.

Upon energization of relay 39 due to the coincidence, the system goes into track operation. Armature 51 which is likewise controlled by relay 39 is moved from contact 52 to contact 53 (track position) whereby resistor 55 is inserted in series with resistor 54, thus increasing the RC constant of the multivibrator of gate generator 36, causing it to produce a gate width of approximately 40 degrees duration. This is in contrast with search operation as pointed out hereinbefore, wherein armature 51 is in contact with contact 52 (search position) with resistor 54 being directly connected to ground which is designed to produce a gate of approximately 30 degrees duration.

Once the receiver is in track operation, it is controlled by the output derived as a result of the phase comparison of the auxiliary reference pulses with the 135 cycle-per-second wave, which will result in a more accurate indication. The output of the 135 cycle-per-second filter 26 is fed into phase shifter 42. This phase shifted output which is continuously varied as a result of being coupled to the output of drive motor 45 through a 9–1 reduction gear train 48, is fed directly into the 135 cycle-per-second square wave generator. The square wave output of this generator is then fed into a suitable phase discriminator 44 where it is compared with the auxiliary reference pulses from auxiliary signal separator 29. In one form of discriminator 44 the pulses from the auxiliary signal separator 29 are fed into the primary of pulse transformer 56 and 57. The secondary windings of these transformers are so connected that a positive pulse is produced at the plate of diode 58 and a negative pulse is produced at the cathode of diode 59. If the pulses from the auxiliary signal separator 29 come in at the positive portion of the square wave, a positive D.-C. voltage is produced at the output. If the pulses from auxiliary signal separator 29 come in at the negative portion of the square wave, a negative D.-C. voltage is produced at the output. If the pulses from auxiliary signal separator 29 overlap equal positive and negative portions of the square wave, the resultant D.-C. output voltage is zero. The output of phase discriminator 44 is then fed into motor control circuit 40 through contact 39b (track position) of relay 39. This motor control circuit 40 is preferably of the type described in the copending U.S. application of E. de Faymoreau, Serial No. 532,818, filed September 7, 1955, now Patent No. 2,810,874 entitled "Motor Control System." But it will be appreciated that any suitable motor control system may be used. The output of the phase discriminator 44, which is fed directly into the motor control circuit 40, is used to control the direction and speed of drive motor 45. The bearing indication of the receiver will be read on bearing indicator 46 which is coupled directly to the output of drive motor 45.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a search and track receiver for receiving signals having a plurality of components whose phase relationship carries information, means for separating said components, gating pulse producing means coupled to said separating means for producing a gating pulse of a given width responsive to one of said components, a search system providing an output for continuously varying the relative phase of said gate pulses with respect to the phase of another of said components, a utilization device coupled to said search system and driven thereby, a track system for comparing certain of said components and producing a corresponding output in response thereto, and switching means responsive to a given phase relationship between said gating pulses and said another of said components to switch said utilization device from said search system and to said track system to be controlled by the latter, said switching means including means to control the gating pulse producing means to produce gating pulses of different width during track operation.

2. In a search and track receiver for receiving signals having a plurality of components whose phase relationship carries information, means for separating said components, gating pulse producing means coupled to said separating means for producing a gating pulse of a given width responsive to one of said components, a search system providing an output for continuously varying the phase of said gating pulses with respect to the phase of another of said components, a utilization device coupled to said search system and driven thereby, a track system for comparing the phase of certain of said components and producing a corresponding output, and switching means responsive to coincidence between said gating pulses and said another of said components to switch said utilization device from said search system and to said track system to be controlled by the latter, said switching means including means to substantially simultaneously control the gate pulse producing means to produce gating pulses of different width.

3. In a search and track receiver for receiving signals having a plurality of components whose phase relationship carrier information, means for separating said components, means responsive to one of said components for producing a gating pulse, said gating pulse producing means being adapted to selectably produce a narrow gating pulse or a wider gating pulse, a variable phase shifting means for effectively producing a relative phase shift between said gating pulse and another of said components, means responsive to a predetermined phase relationship between the relatively phase shifted gating pulse and said other of said components for producing an output, a utilization device, driving means for driving said variable phase shifting means and said utilization device, a source of control voltages for continuously operating said driving means, a tracking system responsive to certain of said components for producing a control output, and switching means in search position coupling said source to said driving means to continuously operate it and controlling said gating pulse producing means to produce narrow gating pulses, said switching means including means responsive to said predetermined phase relationship to decouple said source and couple said control output from said tracking arrangement to said driving means and to control said gating pulse producing means to produce the wider gating pulses.

4. In a searching and tracking receiver for determining the bearing of said receiver with respect to a beacon emitting a complex signal consisting of a fundamental wave and a harmonic wave and spaced main and auxiliary reference signals having predetermined repetition frequencies equal to the frequency of said fundamental and harmonic waves respectively, the phase relationships of said waves and said reference signals varying with said bearing, said receiver comprising means for receiving and separating the aforementioned components of said complex signal, means responsive to the fundamental wave for producing a gating pulse having a pulse width less than one period of said harmonic wave, a first phase shifting means for shifting the relative phase between said gating pulse and said main reference signal, a second phase shifting means for shifting the relative phase between said harmonic wave and said auxiliary reference signal, means for continuously driving said first mentioned phase shifting means, a phase comparison means for comparing the phase of said harmonic wave and said auxiliary reference signal, switching means coupled to said gate pulse producing means and responsive to the coincidence between said gating pulse and said main reference signal for broadening the gate pulse to a duration substantially equal to the period of one of said harmonic waves, said switching means including means for decoupling said continuous driving means from said first phase shifting means and for coupling the output of said phase comparison means to control said second phase shifting means, and a bearing indicator coupled to the second of said phase shifting means.

5. A search and track receiver as in claim 4 wherein said means responsive to the fundamental wave for producing gating pulses includes a multivibrator having an RC network determining the width of the gating pulses, and said switching means includes means for varying the constants of said RC network substantially to vary the gating pulse width.

6. In a searching and tracking receiver for determining the bearing of said receiver with respect to a beacon emitting a complex signal consisting of a fundamental wave and a harmonic wave and spaced main and auxiliary reference signals having predetermined repetition frequencies equal to the frequencies equal to the frequency of said fundamental and harmonic waves respectively, said receiver comprising means for receiving and separating said components of said complex signal, means responsive to the fundamental wave for producing gating pulses, said gating pulse producing means in search operation producing a pulse width substantially less than one period of said harmonic wave and in tracking operation producing a pulse width substantially equal to the period of one of said harmonic waves, a first phase shifting means for shifting the relative phase between said gating pulse and said main reference signal, a second phase shifting means for shifting the relative phase between said harmonic wave and said auxiliary reference signal, means for continuously driving said first phase shifting means during search operation, a phase comparison means for comparing the phase of said harmonic wave and said auxiliary reference signal to produce a control signal, switching means coupled to said gate producing means and responsive to the phase coincidence between said gating pulse and said main reference signal for switching said gate producing means from its search operation to its tracking operation and for substantially simultaneously coupling the control signal from said phase comparing means to control said second phase shifting means, and a bearing indicator coupled to said second phase shifting means.

7. In a search and track system having a plurality of signals whose phase relationship carries information, a plurality of sources of signals, gating pulse producing means coupled to one of said sources for producing a gating pulse of a given width responsive to the signals from said one source, a search system providing an output for continuously varying the relative phase of said gating pulses with respect to the phase of another of said signals from another of said sources, a utilization device coupled to said search system and driven thereby, a track system for comparing certain of said signals and producing a corresponding output in response thereto, and means responsive to a given phase relationship between said gating pulses and another of said signals to switch said utilization device from said search system and to said track system to be controlled by the latter, said switching means including means to control the gating pulse producing means to produce gating pulses of different widths during track operation.

No references cited.